(12) United States Patent
Lipka et al.

(10) Patent No.: US 7,576,971 B2
(45) Date of Patent: *Aug. 18, 2009

(54) ASYMMETRIC ELECTROCHEMICAL SUPERCAPACITOR AND METHOD OF MANUFACTURE THEREOF

(75) Inventors: Stephen M. Lipka, Nicholasville, KY (US); John R. Miller, Shaker Heights, OH (US); Tongsan D. Xiao, Willington, CT (US); Jinxiang Dai, Storrs, CT (US)

(73) Assignee: U.S. Nanocorp, Inc., Farmington, CT (US)

( * ) Notice: Subject to any disclaimer, the term of this patent is extended or adjusted under 35 U.S.C. 154(b) by 36 days.

This patent is subject to a terminal disclaimer.

(21) Appl. No.: 11/711,376

(22) Filed: Feb. 27, 2007

(65) Prior Publication Data

US 2008/0158778 A1 Jul. 3, 2008

Related U.S. Application Data

(63) Continuation-in-part of application No. 09/590,496, filed on Jun. 9, 2000, now Pat. No. 7,199,997.

(51) Int. Cl.
*H01G 9/00* (2006.01)
(52) U.S. Cl. .................. 361/502; 361/503; 361/504; 361/508; 361/512; 361/516
(58) Field of Classification Search .......... 361/502, 361/503–504, 508–512, 523–525, 516–519
See application file for complete search history.

(56) References Cited

U.S. PATENT DOCUMENTS

| 4,313,084 A | 1/1982 | Hosokawa et al. |
| 4,697,224 A | 9/1987 | Watanabe et al. |
| 4,820,599 A | 4/1989 | Furukawa et al. |
| 5,077,150 A | 12/1991 | Yoneda |
| 5,085,955 A | 2/1992 | Cipriano et al. |
| 5,322,746 A | 6/1994 | Wainwright et al. |
| 5,362,579 A | 11/1994 | Rossoll et al. |
| 5,378,599 A | 1/1995 | Randell et al. |

(Continued)

OTHER PUBLICATIONS

Lipka, S.S., Application of Carbon Fiber Materials for Double Layer Capacitors, (Presented at 3rd International Seminar as Double Layer Capacitors and Energy Storage, Dec. 6-8, 1993, Deerfield Beach, FL).

(Continued)

*Primary Examiner*—Nguyen T Ha
(74) *Attorney, Agent, or Firm*—Cantor Colburn LLP

(57) ABSTRACT

Asymmetric supercapacitors comprise: a positive electrode comprising a current collector and a first active material selected from the group consisting of manganese dioxide, silver oxide, iron sulfide, lithium manganese oxide, lithium cobalt oxide, lithium nickel oxide, lithium iron phosphate, and a combination comprising at least one of the foregoing active materials; a negative electrode comprising a carbonaceous active material; an aqueous electrolyte solution selected from the group consisting of aqueous solutions of hydroxides of alkali metals, aqueous solutions of carbonates of alkali metals, aqueous solutions of chlorides of alkali metals, aqueous solutions of sulfates of alkali metals, aqueous solutions of nitrates of alkali metals, and a combination comprising at least one of the foregoing aqueous solutions; and a separator plate. Alternatively, the electrolyte can be a non-aqueous ionic conducting electrolyte or a solid electrolyte.

36 Claims, 4 Drawing Sheets

U.S. PATENT DOCUMENTS

| | | | |
|---|---|---|---|
| 5,392,191 | A | 2/1995 | Thomas et al. |
| 5,415,959 | A | 5/1995 | Pyszczek et al. |
| 5,419,977 | A | 5/1995 | Tennent et al. |
| 5,599,644 | A | 2/1997 | Swierbut et al. |
| 5,600,535 | A * | 2/1997 | Jow et al. ............... 361/503 |
| 5,713,561 | A | 2/1998 | Sugiyama |
| 5,902,696 | A | 5/1999 | Smesko et al. |
| 5,920,455 | A * | 7/1999 | Shah et al. ............... 361/502 |
| 5,923,525 | A | 7/1999 | Belyakov et al. |
| 5,953,204 | A | 9/1999 | Suhara et al. |
| 5,961,887 | A | 10/1999 | Zheng et al. |
| 5,963,417 | A | 10/1999 | Anderson et al. |
| 5,986,876 | A | 11/1999 | Stepanov et al. |
| 5,986,878 | A | 11/1999 | Li et al. |
| 6,031,711 | A | 2/2000 | Tennent et al. |
| 6,036,774 | A | 3/2000 | Lieber et al. |
| 6,048,645 | A | 4/2000 | Saidi et al. |
| 6,097,587 | A * | 8/2000 | Inagawa et al. ............ 361/502 |
| 6,162,530 | A | 12/2000 | Xiao et al. |
| 6,198,623 | B1 * | 3/2001 | Amatucci ............... 361/512 |
| 6,222,723 | B1 | 4/2001 | Razoumov et al. |
| 6,410,181 | B1 | 6/2002 | Spillman et al. |
| 7,199,997 | B1 * | 4/2007 | Lipka et al. ............... 361/502 |

OTHER PUBLICATIONS

Beliakov, A. I., et al., Develoment and Application of Combined Capacitors: Double Electric Layer—Pseudocapacity, (Presented to The 7th International Seminar on Double Layer Capacitors and Similar Energy Storage Devices, Dec. 8-11, 1997, Deerfield Beach, FL).

Varalin, I.N. et al, Nickel-plated fiber electrodes for batteries and electrochemical capacitors (Presented at The 16th International Seminar & Exhibit on Primary & Secondary Batteries, Mar. 1-4, 1999, Fort Lauderdale, FL).

Varakin, I.N. et al, Application of Ultrascapacitors as Traction Energy Source, (Presented at The International Seminar on Double Layer Capacitors and Similar Energy Storage Devices, Dec. 8-10, 1997, Deerfield Beach, FL).

Beliakov, Alex I., et al. Power Performances of High Energy Destiny Caoacitors on System Carbon /Nickel Oxide, (Presented at The 9th International Seminar on double Layer Capacitorsand Similar Energy Storage Devices, Dec. 6-8, 1999, Deerfield Beach, FL.

* cited by examiner (a)

(b)

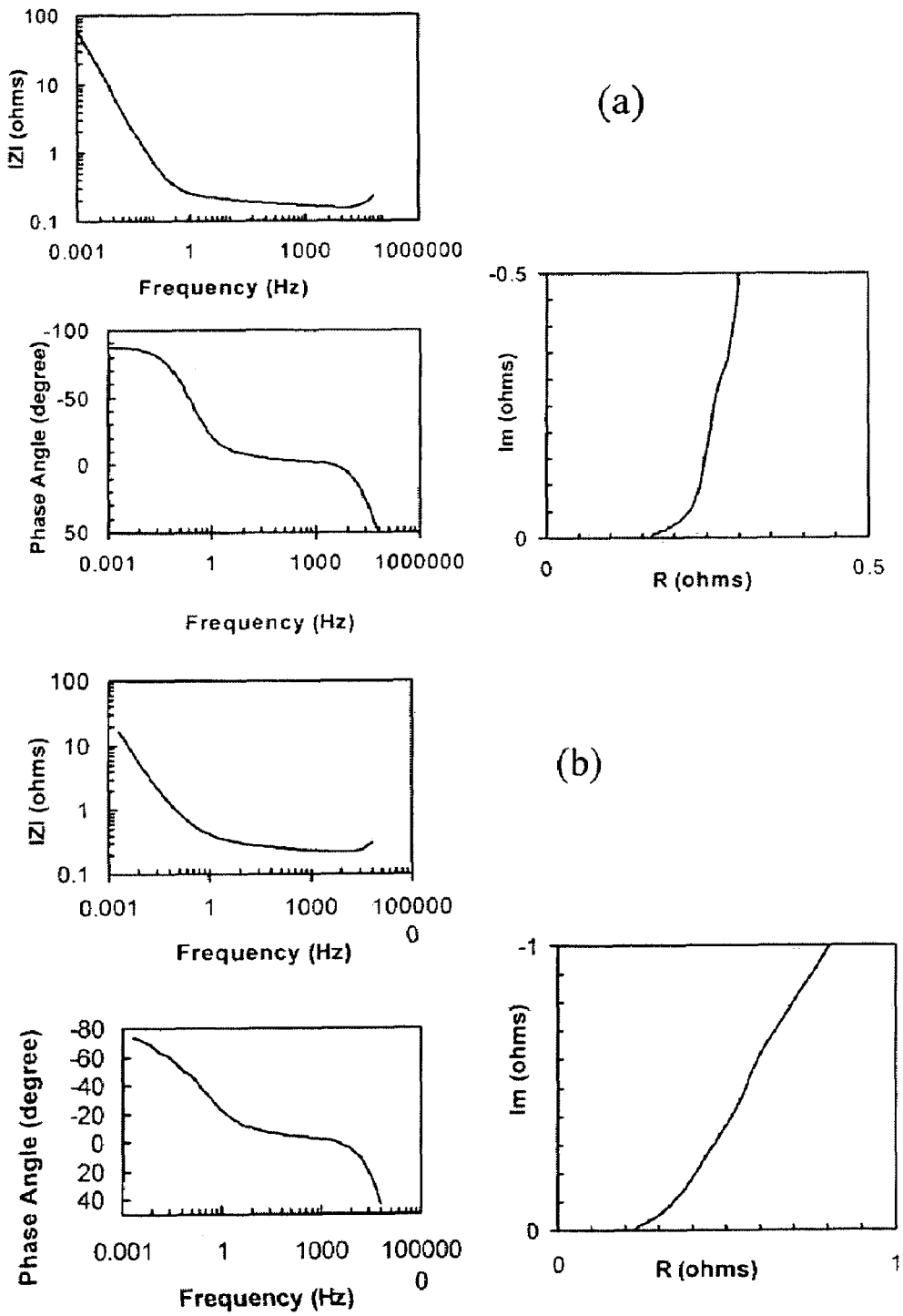
Figure 4. Impedance spectra for symmetric carbon-carbon capacitor (a) and asymmetric manganese-carbon capacitor (b).

ASYMMETRIC ELECTROCHEMICAL SUPERCAPACITOR AND METHOD OF MANUFACTURE THEREOF

CROSS-REFERENCE TO RELATED APPLICATION

This application is a continuation-in-part of, and claims priority to, U.S. patent application Ser. No. 09/590,496, filed Jun. 9, 2000 now U.S. Pat. No. 7,199,997, which is incorporated by reference herein in its entirety.

STATEMENT OF GOVERNMENT INTEREST

The invention was made with Government support under contract NAS 3-99054 awarded by the National Aeronautics and Space Agency. The Government has certain rights in the invention.

FIELD OF THE INVENTION

The present invention relates to electrochemical capacitors. In particular, the present invention relates to asymmetric electrochemical capacitors and methods to improve their energy density and power density.

BRIEF DESCRIPTION OF THE RELATED ART

Electrochemical capacitors (ECs) can store several hundred times more energy per unit weight (gravimetric energy density) and volume (volumetric energy density) than traditional electrolytic capacitors. Hereinafter energy density refers to both gravimetric and volumetric energy density. Additional advantages of ECs include high cycle life (>300 k), high discharge rates (from minutes to milliseconds), safety tolerance to high rate charge, discharge, and overcharge, wide operating temperatures and good state-of-charge indication during charge and discharge. In many cases ECs can exceed the performance of batteries in applications requiring high power density and discharge rates that are in the minutes to seconds range, such as those encountered in pulse discharge applications.

Applications for asymmetric electrochemical capacitors include memory backup devices for computers, digital-clock backup in appliances and military electronics, defibrillators, power supplies (UPS), portable electronics, telephone communication systems, portable x-ray unit power sources, and remote telemetry power sources. Automotive applications include load-leveling in electric vehicles to extend the life of the battery, and to provide power for acceleration, automobile starting, lighting and ignition (SLI), automotive power steering, preheating catalytic converters, and pulse power needs such as power door locks and power windows.

Electrochemical double layer capacitors, also known as supercapacitors, store energy by the charging of the electrode/electrolyte interface (double layer capacitance) or through faradaic reactions (pseudo-capacitance) occurring at or near the electrode surface. The active materials presently under investigation as electrode materials for these devices include activated carbons (typically having surface areas in the range of 1000-3000 $m^2$/g), mixed metal oxides (e.g. ruthenium oxide and iridium oxide) and doped conductive polymers such as polypyrrole and polyaniline. Both aqueous and non-aqueous electrolytes have been used.

Symmetric supercapacitors employ materials having approximately the same level of response to an applied voltage for both electrodes whereas asymmetric supercapacitors utilize two different materials, each having a differing magnitude of response to an applied voltage, for the electrodes. Alternatively symmetric supercapacitors can be described as those employing the same mechanism of energy storage at both electrodes and asymmetric supercapacitors can be described as those employing different mechanisms of energy storage at each electrode. Mechanisms of energy storage include charge separation and faradaic processes (electron transfer).

Supercapacitors possess very high power densities, but low energy densities when compared to batteries. Various approaches have been investigated to increase the energy density of supercapacitors without affecting the high power performance. One approach has been to use non-aqueous electrolytes to increase the operating voltage of the supercapacitor and thus the stored energy. Operating voltages of commercial supercapacitors such as those developed by Panasonic having non-aqueous electrolytes are at values of up to 2.5 volts (V).

A second approach for increasing the energy density of supercapacitors has been to use conducting-polymer electrodes, for instance fluorophenyl thiophene, in both electrodes. These systems operate at approximately 2.8 V. At its present state of development, energy density projections for practical devices are in the range from 6-10 Watt*hours/kilogram (Wh/kg) at power levels of about 2 kilowatts/kilogram (kW/kg), but long-term stability and cycle life remain unclear. This approach requires use of very high purity materials and processes due to the high cell operating voltage, thus adding to the supercapacitor cost.

A third approach for increasing supercapacitor energy density has been to use pseudo-capacitor electrode materials, for example, mixed-oxide systems based on ruthenium oxide and iridium oxide. Generally, most pseudo-capacitor materials require an aqueous electrolyte, which limits cell voltages to about 1.2 V. The increased energy density in these systems is not due to the higher voltage, but rather use of pseudo-capacitive and double layer charge storage on high-surface-area electrodes. Significant (two-fold) energy density increases have been reported recently through the use of hydrated ruthenium oxide electrodes. This apparently allows bulk as well as surface charge storage. However, even with the doubling of energy density, ruthenium-based approaches are prohibitively expensive for automotive applications. For example, in a hybrid vehicle application, raw material costs alone for this approach are well in excess of $100,000.

Low-cost substitutes for the ruthenium-based system have been sought, for example oxides, nitrides, and sulfides of metals such as molybdenum and tungsten. Again, all of these materials require aqueous electrolytes for pseudo-capacitive charge storage. The operating voltage of such materials has been disappointingly low, in the range of 0.6 to 0.8 V for stable operation. This greatly reduces the materials' energy and power density. The materials also remain relatively high cost, especially compared to other supercapacitor materials such as activated carbon, which can offer comparable performance.

U.S. Pat. No. 5,986,876 discloses an asymmetric supercapacitor. In this design, a nickel oxyhydroxide (NiOOH) positive electrode is coupled with an activated carbon negative electrode and a potassium hydroxide (KOH) electrolyte. An asymmetric supercapacitor offers energy density advantages for several reasons. First, the device capacitance is almost equal to the capacitance of the electrode having the smallest capacitance, since $1/C_T = 1/C_1 + 1/C_2$. This is because the other electrode is comprised of material having much higher specific capacity. In contrast, the capacity ratio for a symmetric supercapacitor is about 1, yielding a device capacitance about one-half that of each electrode. Secondly, because one electrode material has such high capacity, its mass and volume can be much smaller than the other electrode. The high-capacity electrode can thus have negligible mass or volume compared to the other electrode, which further increases the energy density of the asymmetric supercapacitor. Lastly, an asymmetric supercapacitor with aqueous electrolyte can reliably operate at voltages above 1.22 V without gas evolution. For example, known asymmetric supercapacitors can operate at 1.7 to 1.8 V, almost double that of commercially available symmetric aqueous supercapacitors. This higher voltage provides almost a four-fold increase in energy density. These three factors can combine to increase the energy density of an asymmetric supercapacitor to eight or more times that of a symmetric supercapacitor.

While the previously discussed improvements are significant, there nonetheless remains a need in the art for improved asymmetric supercapacitors having higher densities, high power performance and long life.

SUMMARY OF THE INVENTION

The above described drawbacks and disadvantages are overcome or alleviated by the asymmetric supercapacitors disclosed herein. According to one embodiment, an asymmetric supercapacitor comprises: a positive electrode comprising a current collector and a first active material selected from the group consisting of manganese dioxide, silver oxide, iron sulfide, lithium manganese oxide, lithium cobalt oxide, lithium nickel oxide, lithium iron phosphate, and a combination comprising at least one of the foregoing active materials; a negative electrode comprising a carbonaceous active material; an aqueous electrolyte solution selected from the group consisting of aqueous solutions of hydroxides of alkali metals, aqueous solutions of carbonates of alkali metals, aqueous solutions of chlorides of alkali metals, aqueous solutions of sulfates of alkali metals, aqueous solutions of nitrates of alkali metals, and a combination comprising at least one of the foregoing aqueous solutions; and a separator plate.

In another embodiment, an asymmetric supercapacitor comprises: a positive electrode comprising a current collector and a first active material selected from the group consisting of manganese dioxide, lithium manganese oxide, lithium cobalt oxide, lithium nickel oxide, lithium iron phosphate, and a combination comprising at least one of the foregoing first active materials; a negative electrode comprising a carbonaceous active material; a non-aqueous ionic conducting electrolyte or a solid electrolyte; and a separator plate The asymmetric supercapacitors have improved energy density by electrically coupling a positive electrode of high faradaic capacity such a one comprising manganese dioxide ($MnO_2$) with a negative electrode that stores charge through charge separation at the electric double-layer such as one comprising carbon. The asymmetric supercapacitors also improve power density by using high surface area nanostructured electrode materials.

The asymmetric supercapacitor offers other practical advantages in addition to higher energy density. For example, its capacitance is lower than that of a double layer capacitor. In particular, the capacitance of the asymmetric supercapacitor is close to the negative electrode capacitance because the positive electrode and negative electrode are serially connected. Moreover, the asymmetric supercapacitor is less expensive since one of its electrodes can comprise low-cost carbon. Further, the voltage balance in a series-string of asymmetric cells can be less problematic than in symmetric cells because of the relatively constant voltage of each cell resulting from the high-capacity electrodes. Therefore, with no voltage de-rating as seen in symmetric cells, the maximum available energy and power densities along with the minimum possible cost can be realized in the system.

BRIEF DESCRIPTION OF THE DRAWINGS

FIGS. 4 *a* and *b* are cyclic voltammograms for Examples 1 and 4.

DETAILED DESCRIPTION OF THE PREFERRED EMBODIMENTS

An asymmetric supercapacitor is disclosed herein which includes a positive electrode comprising a current collector and an active material, a negative electrode comprising a carbonaceous active material, and an electrolyte that may be in the form of a solid, an aqueous solution, or a non-aqueous solution.

The asymmetric supercapacitor has improved energy density by electrically coupling a positive electrode of high faradaic capacity such as one comprising manganese dioxide ($MnO_2$) with a negative electrode that stores charge through charge separation at the electric double-layer such as one comprising carbon. The asymmetric supercapacitor also improves power density by using high surface area nanostructured electrode materials.

Figure 1:
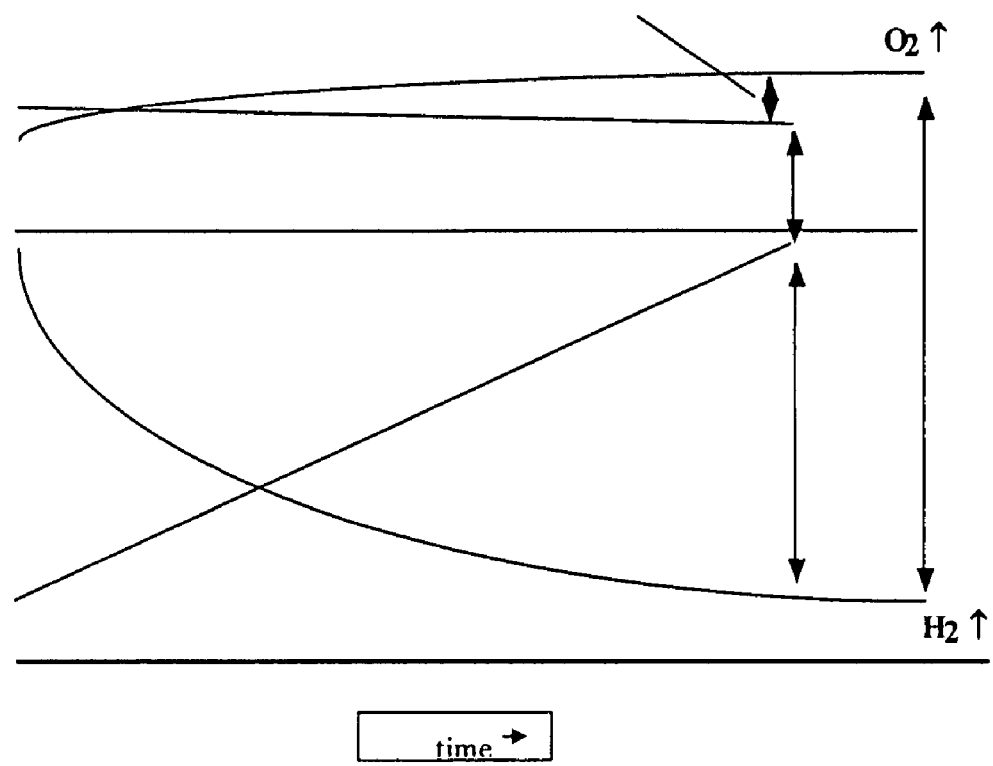
FIG. 1 is a schematic representation of the change in potential at each electrode during charge and discharge.

In order for the electrochemical couple, i.e. the positive and negative electrodes, to obtain high energy density, one of the electrodes, the positive electrode in the instant case, must have a low degree of polarization; the potential of the electrode changes little from its reversible potential during the passage of current. Additionally, non-faradaic processes must be minimized and faradaic processes (electron transfer) occur across the electrode surface at a high reaction rate. The opposite electrode, the negative electrode, should possess a high degree of polarizability and under ideal conditions, should develop a large window of potential change during charge and discharge. Charge storage at the polarizable electrode is through double-layer charge separation. To illustrate, the change in potential occurring at each electrode during charge and discharge is shown schematically in FIG. 1. As can be seen, a large voltage window is developed as the asymmetric supercapacitor is charged. For an asymmetric device containing aqueous electrolyte, the potential window can be limited by hydrogen and oxygen gas evolution at the electrodes. The potential of the electrode with a low degree of polarization remains essentially unchanged during both the charge and discharge processes.

The asymmetric supercapacitor offers other practical advantages in addition to higher energy density. For example, its capacitance is lower than that of a double layer capacitor. In particular, the capacitance of the asymmetric supercapacitor is close to the negative electrode capacitance because the positive electrode and negative electrode are serially connected. Moreover, the asymmetric supercapacitor is less expensive since one of its electrodes can comprise low-cost carbon. Further, the voltage balance in a series-string of asymmetric cells can be less problematic than in symmetric cells because of the relatively constant voltage of each cell resulting from the high-capacity electrodes. Therefore, with no voltage de-rating as seen in symmetric cells, the maximum available energy and power densities along with the minimum possible cost can be realized in the system.

Examples of suitable active materials for the positive electrode include manganese dioxide, silver oxide, iron sulfide, and combinations comprising at least one of the foregoing active materials. Manganese dioxide is preferred. The active material is typically in particulate form, the particles of which have a mean single linear dimension of less than about 100 microns that is preferably nanostructured. The particular form of the active material will depend on the desired performance, cost, and other characteristics of the asymmetric supercapacitor. It is contemplated that a wide variety of forms may be used. For example, the active material may take the form of both irregular and regular shapes, such as amorphous, fibrous, spheroidal, rhomboidal and the like, bird's nest, nanotubes or nanorods as disclosed in U.S. Pat. No. 6,036,774, and the other forms described in U.S. Pat. No. 6,162,530, these patents being incorporated by reference herein. The synthesis and structure of suitable nanostructured sulfides, oxides, and hydroxides are disclosed in U.S. Pat. No. 6,162,530 and U.S. Pat. No. 5,713,561, both of which are incorporated herein by reference. Nanostructured materials are well suited for use in electrodes because they have extremely high surface activity and high accessible surface area. This is in contrast to other high surface area materials in which much of the surface area is contained in deep micropores and thus is largely non-utilizable in capacitor applications. As used herein a nanostructured material refers to materials having a grain size on the order of 1 to 100 nanometers (where 1 nm=10 angstroms). Nanostructured materials are thus characterized by having a high fraction of the material's atoms residing at grain or particle boundaries. For example, with a grain size in the five nanometer range, about one-half of the atoms in a nanocrystalline or a nanophase solid reside at grain or particle interfaces.

Nanostructured metal oxides and hydroxides and sulfides may be produced by an aqueous chemical solution method comprising providing an aqueous starting solution and an aqueous reactant solution, at least one of which comprises at least one precursor metal salt; atomizing the reactant solution into the starting solution to provide a nanostructured powder.

The nanostructured powders may be aged or heat-treated for a length of time effective to transform the completely or partially or crystalline nanostructured powders into the desired crystalline state. This procedure is critical, since it serves to stabilize the nanocrystal structure. Process parameters, which affect the morphology and yield of the nanocrystalline powder product, include temperature of heating, time of heating, and solution pH.

After aging or heat-treating, the nanocrystalline powders are generally isolated by filtration and washed to remove by-products, preferably using deionized, distilled water or other suitable solvent.

Current collectors are well known in the art. They may comprise any conductive material with electrochemical stability in the supercapacitor environment. Examples of such materials include, but are not limited to, metal foil, metal mesh, electrically conductive polymers, electrically conductive polymer composites, and expanded metals. The current collector may be porous or non-porous as desired. The thickness of the current collector must be sufficient to provide current collection to all active material in the electrode uniformly and provide sufficient rate performance (i.e. sustain current performance). Current collectors generally have a thickness of about 10 microns to about 75 microns.

The active material may be applied to the current collector by any method known in the art. One such method is known as pasting. The active material is mixed with a binder to form a slurry and then applied to the current collector. Examples of binders include, but are not limited to, PVDF and fibrillated PTFE. If the binder is a solid then it is first dissolved in a suitable solvent and then following application to the current collector the solvent is evaporated. The choice of binder is dependent upon the active material and the choice of solvent is dependent upon the choice of binder. The selection of binder and solvent are readily determined without undue experimentation by one of ordinary skill in the art.

The electrodes can be formed by thermal spraying onto the current collector. Thermal spray techniques are disclosed in U.S. application Ser. No. 09/485,424, now U.S. Pat. No. 5,599,644, which is herein incorporated by reference. A suspension of nanocrystalline particles is subjected to ultrasonication using an intense ultrasonic probe. Ultrasonication disintegrates any powder aggregates and introduces lattice defects into the nanocrystalline particles. These defects can exert an important influence on the performance of nickel hydroxide, for example, when it is used as the active material in a nickel electrode. Parameters, which affect the final product, include ultrasonic power and processing time.

The final step of thermal spray is generally spray-drying of the ultrasonicated nanoparticle suspension to produce nanoporous spherical powder agglomerates. This procedure produces agglomerates of nanostructured particles, wherein the agglomerates have diameters in the range from about 0.1 to 200 microns, preferably from about 1 to 100 microns, and most preferably about 20 microns. During spray-drying, rapid evaporation occurs as the spray droplets contact the hot air stream to produce a saturated vapor film. Continued evaporation depends on the diffusion rate of the moisture through the surface shell. As the shell thickness increases with time there is a corresponding decrease in the evaporation rate. Since evaporation is an endothermic process, the droplet surface remains cool until the evaporation is complete, even though the gas stream can be fairly hot. Use of aerosol spray-drying ensures that the end-product powder (i.e., $MnO_2$) is free of undesirable phases that might be produced by heating above 200° C. Relevant processing parameters include the precursor delivery rate, inlet and outlet gas temperature, and suspension concentration.

Useful positive electrode thicknesses are about 10 microns to about 250 microns. Preferably the positive electrode thickness is less than about 50 microns.

Examples of suitable carbonaceous active materials for the negative electrode include, but are not limited to, carbon such as graphite, functionalized carbon such as graphitic nanofibers and nanotubes as disclosed in U.S. Pat. No. 6,031,711, which is incorporated by reference herein, carbon composites such as carbon coated with metals and metal oxides such as ruthenium oxide, and combinations comprising at least one of the foregoing active materials. Carbon is preferred. The active material is particulate in nature with a mean particle radius of less than about 100 microns. The term particulate as used herein can includes fibers. The fibers can be loose (discrete) fibers or in the form of a non-woven mat or a woven cloth. Also within the scope of the invention is a two dimensional sheet comprising a carbonized polymer. Useful fibers are less than about 10 microns in diameter. Nanofibrous materials, i.e., fibers with diameters less than about 100 nm, are useful in electrodes due to their high surface area. Nanofibrous carbon with fiber diameters less than about 50 nm is contemplated to be more useful due to its higher surface area.

When the active material of the negative electrode comprises loose particulate material, it may be applied to the optional current collector by any method known in the art including pasting, as described above, and casting. In casting, a slurry of active material with an optional binder is cast into a film. The resulting film is applied to the current collector, preferably with an adhesive. If the active material is in the form of a non-woven mat, woven cloth, or two dimensional sheet, the active material may be applied to the current collector or simply put in close contact with the current collector in the supercapacitor. If the active material is in a form that can stand alone, it may serve the dual purpose of active material and current collector. The carbon active material must be activated and activation can be achieved by any method known in the art. The resulting electrodes are porous, with a porosity of greater than about 80%. The porosity is especially important when employing liquid electrolytes as the pores allow for greater intimate contact between active material and electrolyte. Additionally, the electrode may be coated with a collection coating on the current collector side to improve current collection. The choice of coating is determined by the stability of the coating in conditions of the supercapacitor, especially with regard to corrosion by the electrolyte. For example, nickel coating is typically employed when potassium hydroxide is the electrolyte because nickel is relatively unaffected by the potassium hydroxide. Useful electrodes thicknesses are about 50 microns to about 375 microns.

The electrolytes can be solid or liquid, although liquid electrolytes are preferred. Examples of suitable solid electrolytes include, but are not limited to, polyacids such as isopolyacids and heteropolyacids as disclosed in U.S. Pat. No. 5,986,878, which is incorporated by reference herein. Liquid electrolytes can be aqueous or non-aqueous. Aqueous electrolytes can only sustain up to about 1-2 V of potential in the device before electrochemical decomposition of water occurs. This can be overcome by arranging individual capacitors in parallel or by using non-aqueous electrolytes, which can withstand up to 3-4 V of applied potential. It is also possible to modify the capacitance by adjusting the electrolyte concentration.

A suitable non-aqueous electrolyte is an organic or non-aqueous solvent containing an ion that can intercalate into the electrode surface. The ion can be an anion or cation, depending upon the active material of the electrode.

Other non-aqueous or organic electrolytes are also suitable if they meet the following criteria: (1) the applied potential at which the electrolyte decomposes ("breakdown voltage") is between 1V and 10V, (2) the conductivity of the electrolyte is sufficiently high to facilitate rapid electron transfer between electrodes, preferably in the range of 0.1 to 1000, preferably 0.1 to 500, milliSiemens/cm, and (3) the electrolyte has low or no ability to chelate the metal or to extract the metal from the thin film surface. The electrolyte should chelate or remove less than 5% and preferably less than 1% of the metal from the film surface.

Suitable aqueous electrolytes include aqueous solutions of hydroxides of alkali metals, carbonates of alkali metals, sulfuric acid, or mixtures thereof. The electrolyte is chosen to match the composition of the electrodes so as to minimize the equivalent series resistance (ESR). Such a determination can be made without undue experimentation by one of ordinary skill in the art. When the positive electrode is $MnO_2$ and the negative electrode is activated carbon the preferred electrolyte is potassium hydroxide. The amount of electrolyte is determined by the size of the capacitor. The concentration of the electrolyte is concentration necessary to achieve maximum ionic conductivity at the operating temperature of the capacitor. The electrolyte concentration is typically about 25 weight percent (wt %) to about 45 wt %.

The separator comprises a thin, non-conductive, porous material. It can be composed of any material impervious to the conditions of the supercapacitor, namely exposure to electrical charge and electrolyte. Porosity is typically about 40% to about 87%. Preferably the porosity is about 65% to about 85%. Thickness is typically about 25 microns to about 75 microns. A preferred separator is CELGARD™ 3501 available from Hoechst Celanese Corp.

The asymmetric supercapacitor may be assembled from the above mentioned components in all ways known in the art. When the electrolyte is liquid the electrode materials must be soaked ("wet up") either before electrode construction or after electrode construction. The electrode material may undergo formation (activation) either prior to electrode construction, after electrode construction, or after supercapacitor assembly. When the electrolyte is solid it is disposed adjacent to the electrode. The electrode, electrolyte and current collector, when present, comprise a half cell. The separator is applied to one half cell and then the two half cells are mated and sealed, preferably by heat.

Figure 2:
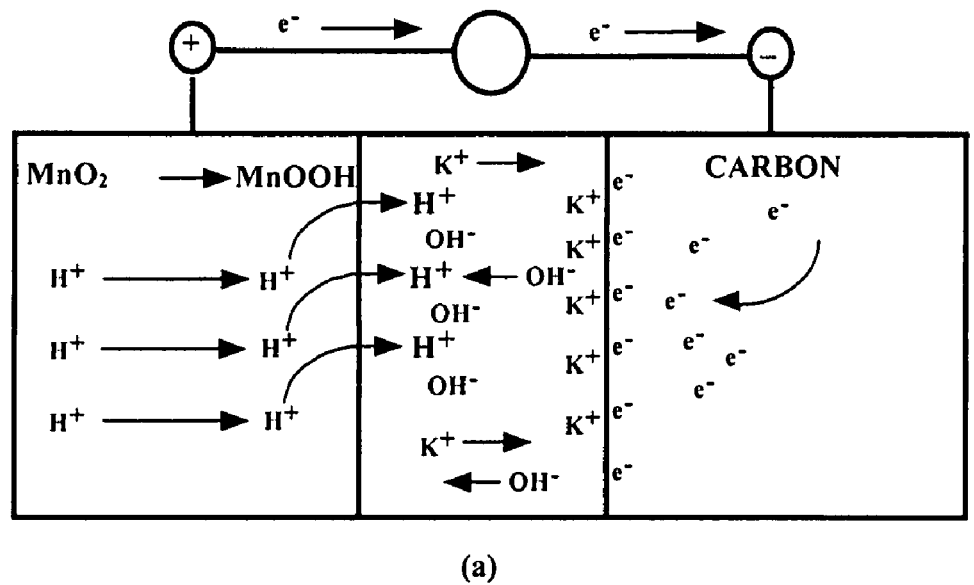
FIG. 2 is a schematic representation of the movement of ions during charge and discharge.
Figure 2:
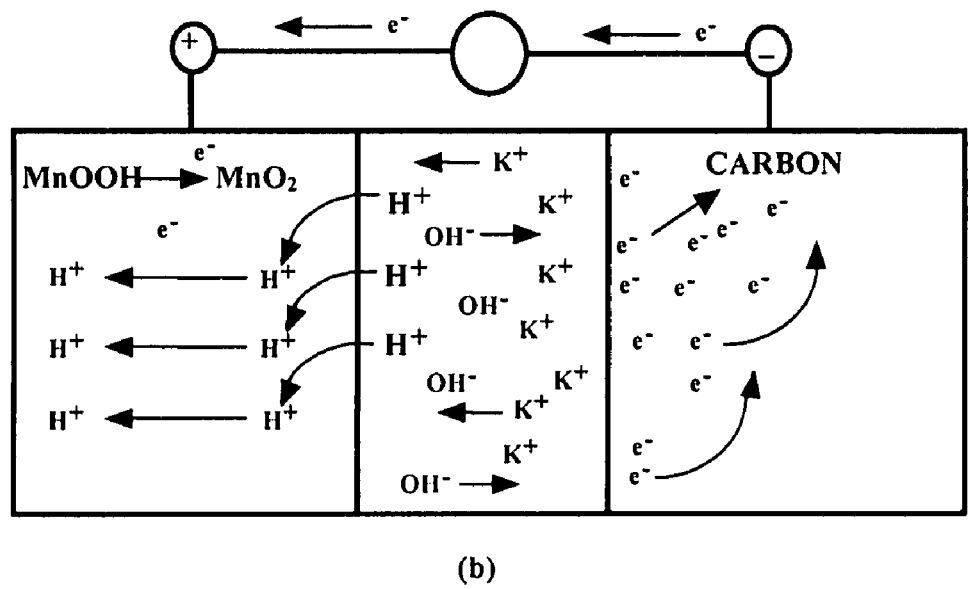

Without being bound by theory, it is expected that the general mechanism for the asymmetric capacitor is similar to that of its aqueous analog, with faradaic processes occurring at the manganese electrode and double-layer charging at the carbon electrode. This is illustrated in FIG. 2, which shows the movement of ions during charge and discharge of an asymmetric supercapacitor containing manganese and carbon in aqueous KOH. During charge, protons from the polarized manganese electrode are ejected and move into the electrolyte (deprotonization) while an electric double layer consisting of hydrated K ions forms on the carbon electrode. This process operates in reverse during discharge.

Figure 3:
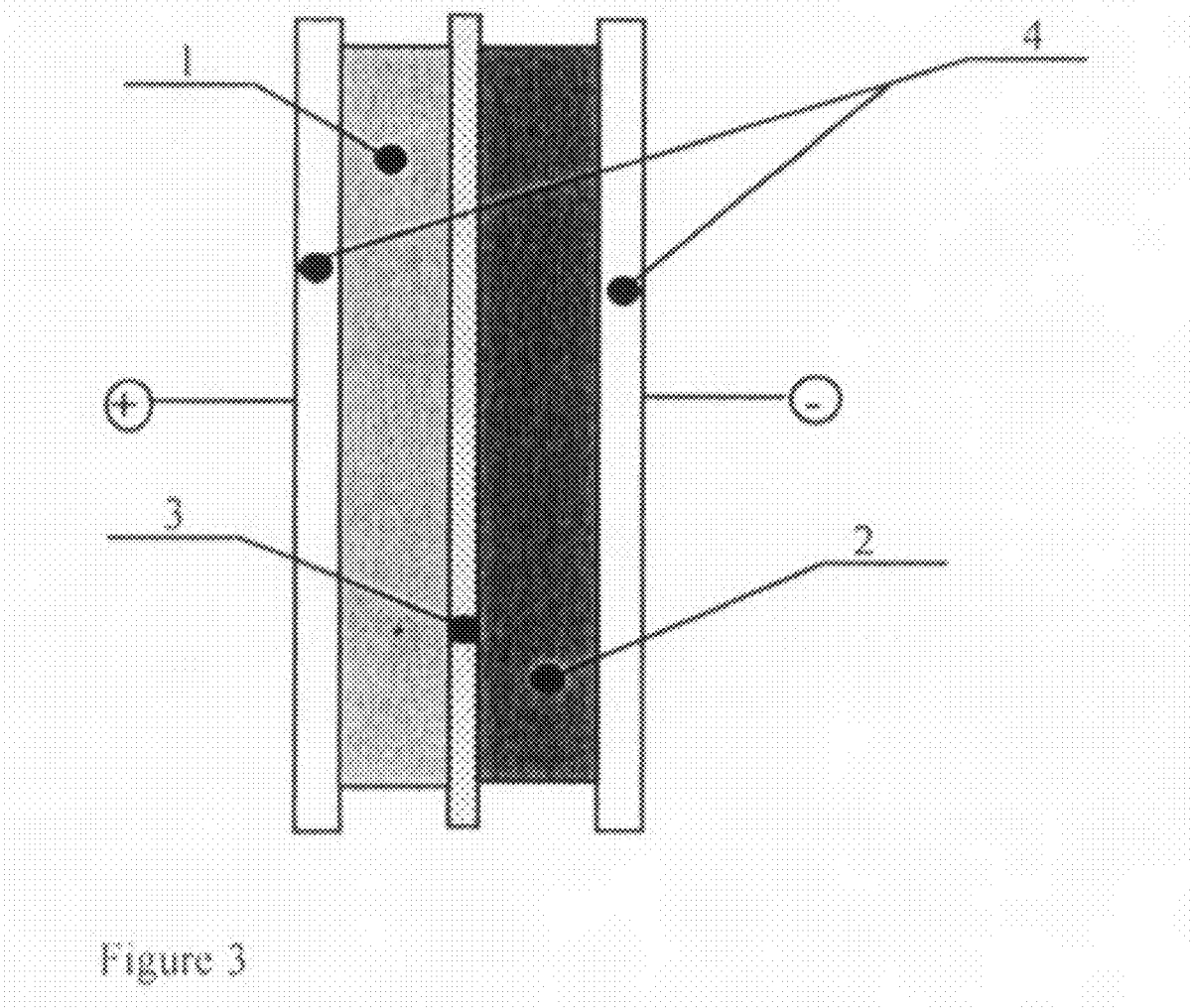
FIG. 3 is a schematic representation of an asymmetric supercapacitor.

FIG. 3 is a schematic representation of a supercapacitor. 1 is the active material for the positive electrode, 2 is the active material for the negative electrode, 3 is the separator and 4 are the current collectors. The electrolyte is dispersed throughout the separator and electrodes.

Improvements

Examples of other active materials that may be used in the positive electrode of the asymmetric superconductor, besides manganese oxide, silver oxide, and ion sulfide, include, but are not limited to, lithium manganese oxide, lithium cobalt oxide, lithium nickel oxide, lithium iron phosphate, and combinations comprising at least one of the foregoing active materials. When an aqueous solution is employed as the electrolyte, manganese dioxide is a preferred active material. However, when a non-aqueous organic electrolyte is used, lithium iron phosphate and lithium cobalt oxide are preferred active materials.

Although a carbonaceous materials is a preferred active material for use in the negative electrode because of the low cost and chemical stability of such materials, other active materials can be used in addition to or to replace the carbonaceous material. Examples of other active materials include, but are not limited to, electrically conductive polymers, metals, metal oxides, metal nitrides, metal sulfides, and combinations comprising at least one of the foregoing active materials. Examples of suitable electrically conductive polymers include, but are not limited to, polyacetylene, polypyrrole, polyaniline, polythiophene, and a combination comprising at least one of the foregoing polymers. Such electrically conductive polymers can also be used in the current collector of the positive electrode. Examples of suitable metals include, but are not limited to, manganese, iron, zinc, cobalt, nickel, cupper, zinc, ruthenium, iridium, palladium, silver, platinum and a combination comprising at least one of the foregoing metals. Examples of suitable metal oxides include, but are not limited to, ruthenium oxide, iridium oxide, copper oxide, nickel oxides; indium oxide, tin oxide, and a combination comprising at least one of the foregoing metal oxides. Examples of suitable metal nitrides include, but are not limited to, titanium nitride, vanadium nitride, and a combination comprising at least one of the foregoing metal nitrides. Examples of suitable metal sulfides include, but are not limited to, iron disulfide, cobalt sulfide, nickel sulfide, silver sulfide, and a combination comprising at least one of the foregoing metal sulfides.

In an embodiment in which the asymmetric supercapacitor comprises an aqueous electrolyte solution, examples of electrolytes besides aqueous solutions of alkali metal hydroxides and carbonates include, but are not limited to, aqueous solutions of chlorides of alkali metals, aqueous solutions of sulfates of alkali metals, aqueous solutions of nitrates of alkali metals, and a combination comprising at least one of the foregoing aqueous solutions.

In an embodiment in which the asymmetric supercapacitor comprises a non-aqueous ionic conducting electrolyte, examples of suitable electrolytes include, but are not limited to an inorganic-based solution comprising a solvent and a salt, an organic-based solution comprising a solvent and a salt, or a combination comprising at least one of the foregoing solutions. The inorganic solvent can be selected from the group consisting of $SOCl_2$, $SO_2$, $NH_3$, and a combination comprising at least one of the foregoing solvents. The salt of the inorganic solution can be selected from the group consisting of $LiAlCl_3$, $LiAlF_3$, $LiPF_6$, $LiBF_4$, $[N(CH_3CH_2)_4]BF_4$, bis (trifluoromethanesulfonyl)imide, and a combination comprising at least one of the foregoing salts. The organic solvents can be selected from the group consisting of propylene carbonate (PC), ethylene carbonate (EC), butylene carbonate (BC), dimethyl carbonate (DMC), diethyl carbonate (DEC), ethyl methyl carbonate (EMC), methyl propyl carbonate (MPC), acetonitrile ($CH_3CN$), and a combination comprising at least one of the foregoing solvents. The salt of the organic solution can be selected from the group consisting of $LiAlCl_3$, $LiAlF_3$, $LiPF_6$, $LiBF_4$, $[N(CH_3CH_2)_4]BF_4$, bis(trifluoromethanesulfonyl)imide, and a combination comprising at least one of the foregoing salts.

In an embodiment in which the asymmetric supercapacitor comprises a solid electrolyte, the solid electrolyte can be a polymer. Examples of suitable polymers include, but are not limited to, polyethylene oxide, polyacrylate, polystyrene, and a combination comprising at least one of the foregoing polymers. Examples of other suitable solid electrolytes include, but are not limited to proton exchange membranes and anion exchange membranes.

The invention is further illustrated by the following non-limiting examples.

EXAMPLES

Supercapacitors were assembled comprising two electrodes on either side of a separator. Both electrodes had a current collector on the side opposite to the separator. Each circular electrode was 0.031 cm thick and 1.9 cm in diameter. The electrolyte was 32 wt % KOH. The separator was Celgard™ 3501. The current collectors comprised carbon black loaded PVC sheet material that was 50 micrometers thick. The particulate carbon was a natural carbon with a 5 micrometer particle size. The nenofiborous carbon was carbon fibers with a diameter of less than 100 nm. The particulate $MnO_2$ was electrochemically formed material wherein the particles had a mean single linear dimension of less than 100 microns. The nanostructured $MnO_2$ had a grain size less than 100 nm. The carbon and $MnO_2$ were saturated with the electrolyte and then weighed. Table 1 shows the composition of each example as well as energy and capacitance data. Electrochemical impedance measurements were made on each example at 1.7 V for the asymmetric cells and 1.0 V for the symmetric cells. Device capacitance was measured at 2 mHz for all examples. Energy density (Wh/kg) calculations were based on the wet mass of the active materials only. Examples 6 and 7 are symmetric supercapacitors with two carbon electrodes and as such are comparative examples and outside the scope of the invention.

TABLE 1

| Example | Type of Carbon | Wet mass of Carbon (mg) | Type of $MnO_2$ | Wet mass of $MnO_2$ (mg) | Capacitance (F) | Energy (J) | Wh/kg |
| --- | --- | --- | --- | --- | --- | --- | --- |
| 1 | particulate | 100 | particulate | 165 | 5.1 | 7.4 | 7.7 |
| 2 | particulate | 100 | particulate | 125 | 3.9 | 5.7 | 7.0 |
| 3 | particulate | 100 | nanostructured | 175 | 5.4 | 7.8 | 7.9 |
| 4 | nanofibrous | 800 | particulate | 165 | 6.3 | 9.2 | 2.6 |
| 5 | nanofibrous | 800 | nanostructured | 210 | 7.5 | 10.8 | 3.0 |
| 6* | particulate | 200 | — | — | 2.4 | 1.2 | 1.7 |
| 7* | nanofibrous | 200 | — | — | 0.33 | 0.17 | 0.23 |

*Comparative examples

The data show that Examples 1-3, asymmetric capacitors combining $MnO_2$ with activated carbon have energy densities in excess of 7 Wh/kg, over 4 times that of the symmetric carbon/carbon device. The data also show that the capacitor containing the nanofibrous $MnO_2$ showed the highest energy density of all the devices.

FIG. 4a is a cyclic voltammogram for Example 1 and FIG. 4b is a cyclic voltammogram for Example 5. Cyclic voltammograms were obtained by cycling the cell between 0.75-1.5 V, 0.75-1.6 V and 0.75-1.7 V at a sweep rate of 10 mV/s. The resulting voltammograms are presented show capacitive behavior of the examples over the entire voltage window. These data also show a large voltage window of stability for the electrochemical couple, over 2 V. Example 5 shows a more symmetric current behavior over the voltage window when compared to Example 1. Also, Example 5 showed a correspondingly larger capacitance than Example 1 as evidenced by an increase in the anodic and cathodic currents.

As can be seen by the foregoing description and examples the asymmetric supercapacitor described herein exhibits improved energy and power density when compared to asymmetric supercapacitor. Additionally the asymmetric supercapacitor provides the improved energy and power density in a cost effective manner.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. An asymmetric supercapacitor comprising:
   a positive electrode comprising a current collector and a first active material selected from the group consisting of manganese dioxide, silver oxide, iron sulfide, lithium manganese oxide, lithium cobalt oxide, lithium nickel oxide, lithium iron phosphate, and a combination comprising at least one of the foregoing active materials;
   a negative electrode comprising a carbonaceous active material;
   an aqueous electrolyte solution selected from the group consisting of aqueous solutions of hydroxides of alkali metals, aqueous solutions of carbonates of alkali metals, aqueous solutions of chlorides of alkali metals, aqueous solutions of sulfates of alkali metals, aqueous solutions of nitrates of alkali metals, and a combination comprising at least one of the foregoing aqueous solutions; and
   a separator plate.

2. The asymmetric supercapacitor of claim 1 wherein the negative electrode further comprises another current collector and a second active material selected from the group consisting of a conductive polymer, a metal, a metal oxide, a metal nitride, a metal sulfide, and a combination comprising at least one of the foregoing active materials.

3. The asymmetric supercapacitor of claim 2 wherein the another current collector is selected from the group consisting of a metal foil, a metal mesh, an electrically conductive polymer composite, and an expanded metal.

4. The asymmetric supercapacitor of claim 2 wherein the another current collector comprises a thermally sprayed thin film.

5. The asymmetric supercapacitor of claim 2 wherein the another current collector comprises an electroplated thin film.

6. The asymmetric supercapacitor of claim 2 wherein the another current collector comprises a conductive polymer selected from the group consisting of polyacetylene, polypyrrole, polyaniline, polythiophene, and a combination comprising at least one of the foregoing polymers.

7. The asymmetric supercapacitor of claim 2 wherein the conductive polymer is selected from the group consisting of polyacetylene, polypyrrole, polyaniline, polythiophene, and a combination comprising at least one of the foregoing polymers.

8. The asymmetric supercapacitor of claim 2 wherein the metal of the negative electrode is selected from the group consisting of manganese, iron, zinc, cobalt, nickel, cupper, zinc, ruthenium, iridium, palladium, silver, platinum, and a combination comprising at least one of the foregoing metals.

9. The asymmetric supercapacitor of claim 2 wherein the metal oxide of the negative electrode is selected from the group consisting of ruthenium oxide, iridium oxide, cupper oxide, nickel oxide; indium oxide, tin oxide, and a combination comprising at least one of the foregoing metal oxides.

10. The asymmetric supercapacitor of claim 2 wherein the metal nitride of the negative electrode is selected from the group consisting of titanium nitride, vanadium nitride, and a combination comprising at least one of the foregoing metal nitrides, and wherein the metal sulfide of the negative electrode is selected from the group consisting of iron disulfide, cobalt sulfide, nickel sulfide, silver sulfide, and a combination comprising at least one of the foregoing metal sulfides.

11. The asymmetric supercapacitor of claim 1 wherein the carbonaceous active material comprises a nanofibrous material, a carbon nanotube, a graphite material, and a combination comprising at least one of the foregoing materials.

12. The asymmetric supercapacitor of claim 11 wherein the carbonaceous active material comprises discrete carbon fibers less than about 10 microns in diameter.

13. The asymmetric supercapacitor of claim 12 wherein the carbonaceous active material comprises carbon fibers less than about 100 nm in diameter.

14. The asymmetric supercapacitor of claim 13 wherein the carbonaceous active material is carbon fibers less than about 50 nm in diameter.

15. The asymmetric supercapacitor of claim 1 wherein the negative electrode has a thickness about 50 microns to about 375 microns.

16. The asymmetric supercapacitor of claim 1 wherein the carbonaceous active material is a non-woven mat, a woven cloth, or a two dimensional sheet comprising a carbonized polymer.

17. The asymmetric supercapacitor of claim 1 wherein the negative electrode further comprises a collection coating.

18. The asymmetric supercapacitor of claim 1 wherein the first active material comprises manganese dioxide.

19. The asymmetric supercapacitor of claim 18 wherein the manganese dioxide is nanostructured.

20. The asymmetric supercapacitor of claim 1 wherein the first active material is nanostructured.

21. The asymmetric supercapacitor of claim 1 wherein the first active material is applied to the current collector by thermal spray.

22. The asymmetric supercapacitor of claim 1 wherein the positive electrode further comprises a binder.

23. The asymmetric supercapacitor of claim 1 wherein the current collector is selected from the group consisting of a metal foil, a metal mesh, an electrically conductive polymer composite, and an expanded metal.

24. The asymmetric supercapacitor of claim 1 wherein the positive electrode thickness is less than about 250 microns.

25. The asymmetric supercapacitor of claim 24 wherein the positive electrode thickness is less than about 50 microns.

26. An asymmetric supercapacitor comprising;
   a positive electrode comprising a current collector and a first active material selected from the group consisting of manganese dioxide, lithium manganese oxide, lithium cobalt oxide, lithium nickel oxide, lithium iron phosphate, and a combination comprising at least one of the foregoing first active materials;
   a negative electrode comprising a carbonaceous active material;
   a non-aqueous ionic conducting electrolyte or a solid electrolyte; and
   a separator plate.

27. The asymmetric supercapacitor of claim 26 wherein the carbonaceous active material is selected from the group consisting of a nanofibrous material, a nanotube, a graphite material, and a combination comprising at least one of the foregoing materials.

28. The asymmetric supercapacitor of claim 26 wherein the first active material is nanostructured.

29. The asymmetric supercapacitor of claim 26 wherein the carbonaceous active material is nanostructured.

30. The asymmetric supercapacitor of claim 26 wherein the negative electrode further comprises a second active material selected from the group consisting of a metal, a metal oxide, a metal nitride, a metal sulfide, and a combination comprising at least one of the foregoing second active materials.

31. The asymmetric supercapacitor of claim 30, wherein the second active material is nanostructured.

32. The asymmetric supercapacitor of claim 26 wherein the ionic conducting electrolyte is a non-aqueous inorganic solution comprising a solvent and a salt, wherein the solvent is selected from the group consisting of $SOCl_2$, $SO_2$, $NH_3$, and a combination comprising at least one of the foregoing solvents, and wherein the salt is selected from the group consisting of $LiAlCl_3$, $LiAlF_3$, $LiPF_6$, $LiBF_4$, $[N(CH_3CH_2)_4]BF_4$, bis(trifluoromethanesulfonyl)imide, and a combination comprising at least one of the foregoing salts.

33. The asymmetric supercapacitor of claim 26 wherein the ionic conducting electrolyte is a non-aqueous organic solution comprising a solvent and a salt, wherein the solvent is selected from the group consisting of PC, EC, BC, DMC, DEC, EMC, MPC, $CH_3CN$, and a combination comprising at least one of the foregoing solvents, and wherein the salt is selected from the group consisting of $LiAlCl_3$, $LiAlF_3$, $LiPF_6$, $LiBF_4$, $[N(CH_3CH_2)_4]BF_4$, bis(trifluoromethanesulfonyl)imide, and a combination comprising at least one of the foregoing salts.

34. The asymmetric supercapacitor of claim 26 wherein the solid electrolyte is a polymer selected from the group consisting of a polyethylene oxide, a polyacrylate, a polystyrene, and a combination comprising at least one of the foregoing polymers.

35. The asymmetric supercapacitor of claim 26 wherein the solid electrolyte is a proton exchange membrane.

36. The asymmetric supercapacitor of claim 26 wherein the solid electrolyte is an anion exchange membrane.

* * * * *